Patented Feb. 11, 1941

2,231,664

UNITED STATES PATENT OFFICE 2,231,664

DENATURED ALCOHOL CONTAINING MESITYL OXIDE

Louis J. Figg, Jr., Kingsport, Tenn., assignor to Eastman Kodak Company, Rochester, N. Y., a corporation of New Jersey No Drawing. Application October 14, 1937, Serial No. 168,968

1 Claim. (Cl. 252—366)

This invention relates to the denaturing of ethyl alcohol, and to alcohol so denatured.

It is an object of my invention to provide a denaturant which will render ethyl alcohol containing it unfit for use as a beverage, which cannot be economically removed from the alcohol by any known methods; which will not render the alcohol unfit for industrial uses in which denatured alcohol has customarily been employed, and which will be free from methanol. Other objects will hereinafter appear.

I have discovered that mesityl oxide, $$CH_3.CO.CH:C(CH_3)_2$$

is an effective denaturant for alcohol. In denaturing ethyl alcohol with my novel denaturant, I may use from 0.5 to 5 parts of the ketone, or even more, per 100 parts of 95% alcohol.

My novel denaturant may be used alone in denaturing, or it may be used in conjunction with denaturing materials derived from the destructive distillation of hardwood, such as those which are described in my U. S. Patents 1,975,090; 1,975,091, and 1,975,092. While I may use a mechanical mixture of the aliphatic ketone with the hardwood denaturants, I prefer to introduce the mesityl oxide, along with the hardwood denaturant oils, into the upper portions of a bubble-cup fractionating column, where they are met by the ascending vapors of ethyl alcohol or of a mixture of ethyl alcohol and denaturing grade isopropanol, in the manner which is fully set forth in my Patent 1,975,091. The proportions in which the mesityl oxide may be used may vary widely.

As an illustrative example, I may introduce into the column, in metered proportions:

|  | Per cent by volume |
|---|---|
| 95% ethyl alcohol | 36.0 |
| Denaturing grade isopropanol | 24.0 |
| Light acid oil | 2.0 |
| Washed alcohol oil | 3.0 |
| Allyl alcohol fraction | 2.5 |
| Neutral oil | 2.5 |
| Acetone | 10.0 |
| Mesityl oxide | 20.0 |

The light acid oil and washed alcohol oil and the allyl alcohol fraction referred to are described in my U. S. Patent 1,975,091. Neutral oil is made by adding a 15% solution of sodium hydroxide to hardwood creosote oils and separating the wood oils which are insoluble in the sodium hydroxide solution. The separated oil is then given a vacuum distillation to stabilize it to a lemon-yellow color.

From 0.5 to 5 parts, or even more, of such a combination as that described above may be used per 100 parts of 95% alcohol. My novel denaturant may also be used with any other denaturants with which it may be found to be compatible.

What I claim as my invention and desire to be secured by Letters Patent of the United States is:

Industrial ethyl alcohol denatured with 0.5 to 5 parts of mesityl oxide, as an essential denaturing element, per 100 parts of 95% ethyl alcohol.

LOUIS J. FIGG, JR.